United States Patent [19]

Laragione et al.

[11] Patent Number: 4,638,444

[45] Date of Patent: Jan. 20, 1987

[54] MICROPROCESSOR-CONTROLLED BACK-PRESSURE SYSTEM FOR SMALL VOLUME CHEMICAL ANALYSIS APPLICATIONS

[75] Inventors: Robert Laragione, Christiana; Steven M. Lurcott, West Chester, both of Pa.; Woodford A. Bowe, Rising Sun, Md.; Eugene J. Levy, Oxford, Pa.

[73] Assignee: Chemical Data Systems, Inc., Oxford, Pa.

[21] Appl. No.: 467,461

[22] Filed: Feb. 17, 1983

[51] Int. Cl.$^4$ .............................................. G05B 11/00
[52] U.S. Cl. ..................................... 364/510; 364/558; 364/497; 137/487; 137/487.5
[58] Field of Search .................... 364/510, 558, 183; 137/487.5

[56] References Cited

U.S. PATENT DOCUMENTS

| | | | |
|---|---|---|---|
| 3,509,729 | 5/1970 | Lupfer | 364/558 |
| 4,059,128 | 11/1977 | Heske et al. | 137/487.5 |
| 4,277,832 | 7/1981 | Wong | 137/487 |
| 4,303,984 | 12/1981 | Houvig | 364/558 |
| 4,336,590 | 6/1982 | Jacq et al. | 364/510 |
| 4,373,549 | 2/1983 | Nalepa et al. | 137/487.5 |
| 4,384,925 | 5/1983 | Stetter et al. | 364/497 |
| 4,417,312 | 11/1983 | Cronin et al. | 364/510 |

*Primary Examiner*—Parshotam S. Lall
*Attorney, Agent, or Firm*—Nelson E. Kimmelman; Louis Weinstein

[57] ABSTRACT

A system for maintaining back-pressure in chemical laboratory testing apparatus includes a modified flow control valve governed by a special control system which includes an input/output controller. That controller includes a microprocessor and memory into which a program developed specifically for the modified valve has been placed. A pre-pressure valve is also used upstream of the instrument in which the pressure is to be maintained for effecting quicker control of the pressure. The input/output controller, in conjunction with the servo-amplifier, integrates out the error between the desired set-point pressure and actual pressure thereby enabling maintenance of pressure within one pound.

18 Claims, 4 Drawing Figures

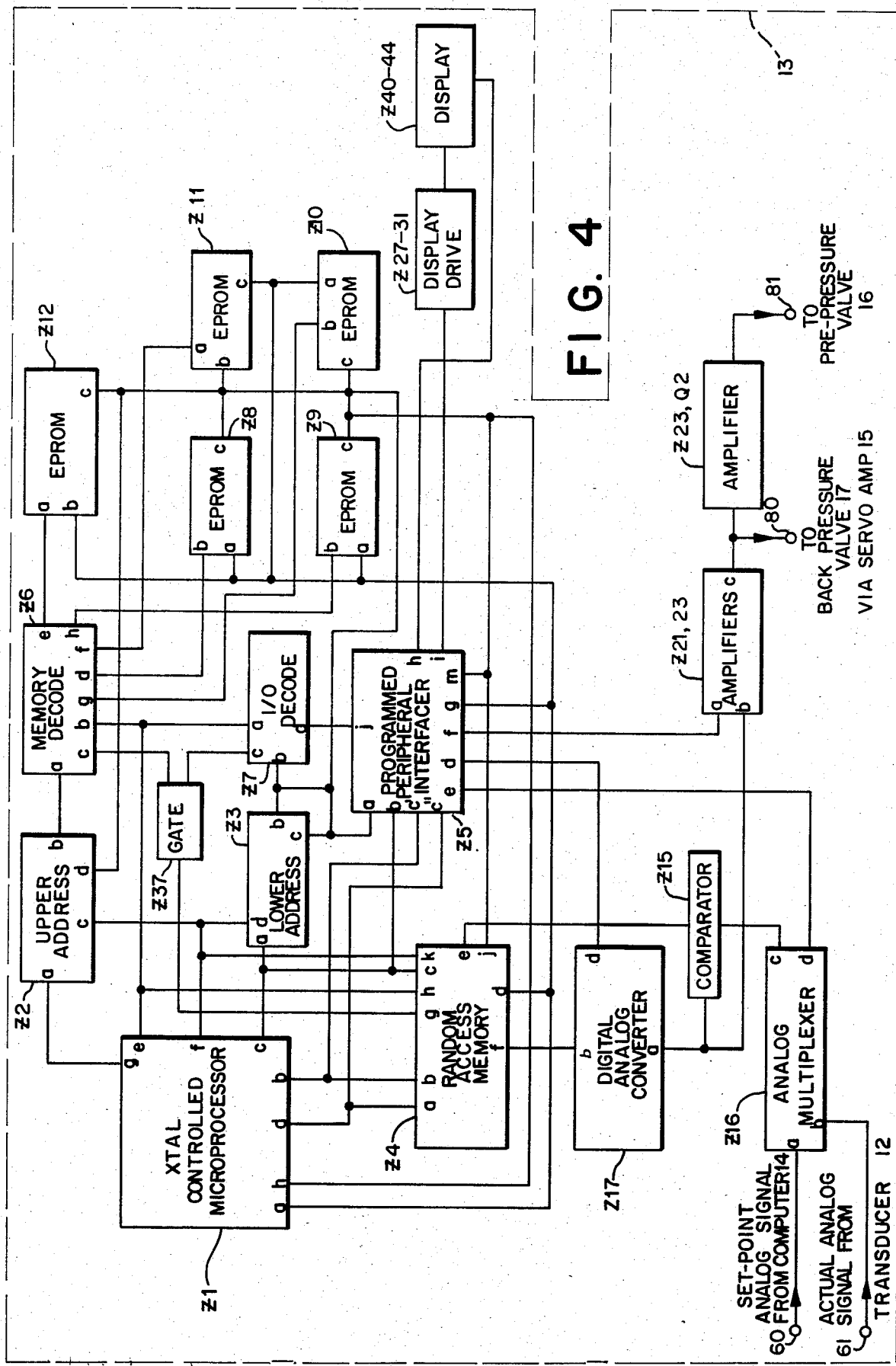

MICROPROCESSOR-CONTROLLED BACK-PRESSURE SYSTEM FOR SMALL VOLUME CHEMICAL ANALYSIS APPLICATIONS

BACKGROUND OF THE INVENTION

A. Field of the Invention

This invention relates to systems and components of systems used in certain chemical testing apparatus, in particular to a system for control of back-pressure in chemical analysis systems which involve small volume instrumentation.

B. Prior Art

While there have always been systems which involve the maintenance of pressure, especially back pressure, within prescribed limits, they generally have involved systems in which there was a large fluid flow controlled by manually or electrically operated pressure valves. In such systems, there was usually not a requirement for stringent control of gas pressure to tight tolerances.

There are, however, certain applications which demand extremely rigid governance of pressure. Among them are certain chemical analytic or laboratory testing systems in which there is a very small flow of gas through a small volume chamber such as a microreactor or micro-pilot plant system. An example of the latter is the Series 8000 micro-pilot plant made and marketed by Chemical Data Systems, Inc. of Oxford, Pennsylvania. Into the chamber a substance under test, such as a catalyst, is inserted and then various types of gases are fed through the chamber. To accurately test the properties of the catalyst as it affects the gases fed to the chamber, it is important that the pressure and/or temperature within its enclosure be tightly controlled. For rapid and accurate temperature control, a micro-reactor tube subassembly such as the one disclosed in the copending application of Bowe et al, U.S. Ser. No. 463,339 filed Feb. 2, 1983 entitled "Chemical Microreactor Having Close Temperature Control" may be employed. The problem of attainment of rigid pressure (back-pressure) controls for use downstream of the chamber in such miniature or micro-flow systems also presented problems. It was found that conventional pressure control valves for larger scale apparatus which had motorized drives did not have sufficient rapidity of response to maintain the pressure within prescribed bounds. It was then decided to try to use ordinary, larger scale, metering (rather than pressure) valves and operate them with some sort of motorized drive, but this also was found unsatisfactory from a number of standpoints including their sluggishness.

Resort then was had to a commercially available flow control valve intended for relatively large flow rates upstream of the chamber. One such valve had the advantage of relatively high frequency response, but its inlet and outlet orifices were much larger than needed for the small flow involved. Sometimes actuation of this valve would cause such a large pressure drop that the stability of the pressure was reduced. Moreover, the valve could be set into oscillation under certain circumstances. Another disadvantage of those valves is the fact that, being located upstream of a reactor, they were not designed to operate on gases raised to high temperatures. Thus, if the gases involved had molecular weights which were considerably higher than oxygen or hydrogen, for example, upon passing out of the high temperature chamber, they would condense on the inner walls of the tubing leading from the chamber outlet. Finally, that commercially available flow control valve had a valve element that was not sufficiently resistant to certain types of chemicals or to the elevated temperatures involved.

In accordance with the present invention, therefore, it is among the objects of the present invention to provide a back-pressure valve assembly for such small-volume applications that has sufficiently fast frequency response, greater resistance to chemical attack and high temperature damage, less susceptibility to oscillation, and has means for preventing condensation of certain gases on the inner walls of tubing coupled to it.

Once the appropriate pressure valve had been constructed, it was found that automatic control of the driving means (solenoid) of such a valve presented problems. It was soon realized that driving the solenoid with a signal from a servo amplifier of Type 1 construction was incapable of maintaining the pressure of the chamber within the very tight bounds demanded by this precision system. A Type 2 servo system which integrates out the error so as to reduce the difference between the actual and set-point voltage was designed and found better for this purpose.

It is therefore also among the objects of the present invention to provide a Type 2 servo system which can cooperate with a back-pressure valve of the type described, to maintain a gas pressure within the chamber that is within one pound of the set-point pressure.

SUMMARY OF THE INVENTION

A system for maintaining back-pressure in a low flow, low volume chemical laboratory apparatus employing a high frequency responsive pressure-regulating valve includes a microprocessor programmed to produce a corrective modified set point signal applied to the valve so that the latter regulates the actual pressure to equal a desired set point pressure for a predetermined number of subsequent samplings.

BRIEF DESCRIPTION OF THE DRAWINGS

FIG. 4 is a detailed block diagram showing various constituent elements of one of the blocks shown in FIG. 2.

DETAILED DESCRIPTION OF THE DRAWINGS

Figure 1:
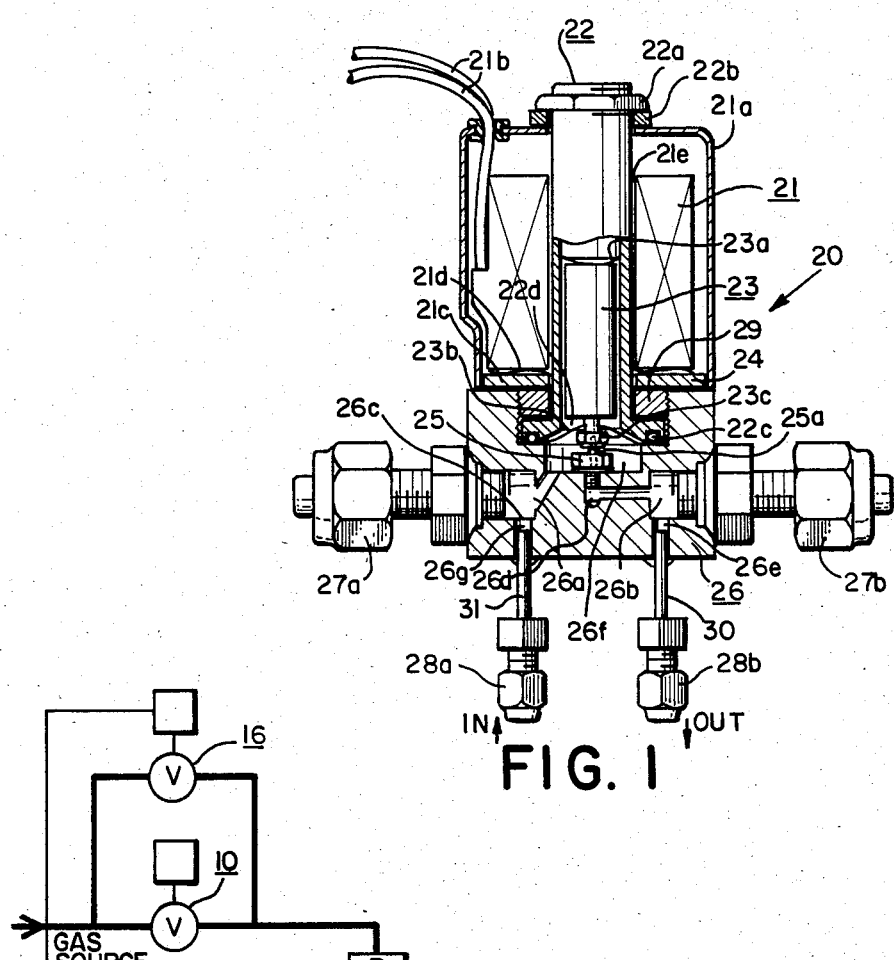
FIG. 1 is a side elevation view, partly broken away and partly in section, of a modified flow control valve used in the present system.

Referring now to FIG. 1, there is shown a valve 20 developed by the inventors having the requisite frequency response, corrosion resistance, resistance to build-up of condensed products, and resistance to oscillation. It includes an upper housing member 21a having an aperture through which leads 21b pass to a solenoid 21. The solenoid has a central bore 21e through which elongated member 22 extends. A nut 22a is screwed to its threaded upper end with a washer 22b between it and housing 21a. At the lower end of the member 22 there is a portion 23b having inset therein a sealing O-ring 22c made out of "Teflon", the trademark for a plastic of E.I. DuPont de Nemours. That plastic is extremely resistant to gases such as carbon monoxide as well as to high temperatures Just below solenoid 21 there is a resilient washer 21d and another rigid washer 24 below that. Below washer 24 there is an annular collar 29 whose edge is threaded so as to screw into the top threaded aperture of base block 26.

The member 22 has a bore 22d in which there is an armature 23 having an upper spiral resilient member 23a fixed to its upper end and which normally is arranged to keep the armature tight against nut 25. At its lower end there is attached by nut 23c one or more larger resilient members 23b. The diameter of portion 23b is slightly smaller than the internal diameter of O-ring 22c. The lower surface of portion 23b is slightly dished to accommodate the upward flexion of resilient member 23b whose rim rests on the shoulder of the threaded bore into which threaded collar 29 is screwed. The nut has on its lower end face a central circular recess into which is set a resilient sealing material such as the plastic "Rulon" marketed by E.I. DuPont. This recess engages an apertured boss 25a formed on the top of hex cap bolt 25 that has a central axial passageway communicating with the aperture. Bolt 25 is screwed into a vertical hole that is in communication with horizontal passageway 26d. The latter connects to larger horizontal threaded chamber 26b that is closed off to the outside by capping nut 27b since the large orifice presented by chamber 26b presented problems in use of this valve for low volume, low flow applications. A small vertical exit passageway 26e is formed in base block 26 which communicates with chamber 26b. A tubular outlet member 30 is inserted part way into passageway 26e and molded to the underside of base block 26. The lower end of tube 30 is equipped with an outlet fitting 28b.

On the left inlet side, the normal large apertured entrance chamber 26a is closed off by a capping nut 27a. Chamber 26a communicates with an aperture 26c formed in the central lower, smaller recess 26f. To adapt the valve for the present low flow, low volume application, a very much smaller tubular entrance member 31 is inserted into a small vertical passageway 26g that communicates with entrance chamber 26a and is welded to the underside of block 26. A threaded entrance fitting 28a is also screwed on tube 31.

While the valve shown in FIG. 1 was originally a normally closed Brooks control valve Model 5835C9F5E1 modified by (1) adding the narrow inlet tubes 30 and 31 and closing off the larger horizontal inlets, (2) stretching the spring 23a and sometimes using two springs 23b and (3) substituting a different plastic for the armature seat that engages 25a, it should be understood that equivalent devices could also be used. In the present invention, the valve was heated to about 175° C. which was considerably higher than the temperature range of about 150° F. at which the unmodified valve was conventionally operated. As modified, the valve had a response of 40–50 Hz, which enabled it to respond quickly to a modified set-point signal produced by the control subassembly 13 and fed to a servo amplifier. Use of Type 1 servos to generate error signals applied to the valve 17 to produce and maintain a desired pressure setting worked to a certain extent, but not to the degree desired. A Type 2 servo worked even better with this valve, but still the pressure control was not up to the required standard. It was only when the control subassembly 13 was operated in accordance with a programmed process embodied in its software that the desired level of operation was attained.

Figure 2:
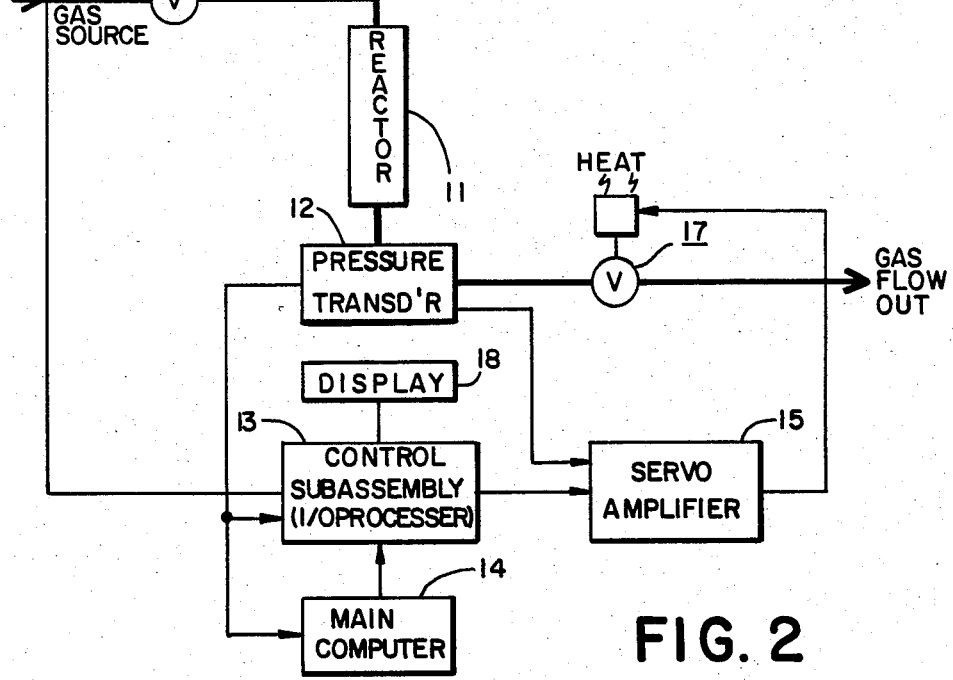
FIG. 2 is a schematic representation of the general system in which the present invention can be employed.

Referring now to FIG. 2, an overall microreactor or micro-pilot testing system embodying the present invention in shown schematically. Heavy lines indicate gas flow, light lines indicate schematically connections between various ones of the elements that cooperate to produce the proper pressure within the reactor 11. A gas from a source is applied via two inlet, electrically-controlled valves 16 and 10 to the inlet end of the reactor 11. Valve 10 is a flow valve that is controlled either electrically, as shown, or manually. The parallel branch contains a pre-pressure valve 16 which is intended to operate quickly whenever the pressure within the reactor 11, as measured by the pressure transducer 12, exceeds a predetermined difference between the desired pressure and the actual pressure. In this case, the pressure transducer 12 signals the control subassembly 13 to actuate the solenoid of valve 16 to open the latter whereupon the pressure is restored in the reactor quickly to a reading much closer to the desired set-point pressure.

The flow through the reactor 11 and pressure transducer 12 proceeds through a back-pressure regulating valve 17 to any desired point. If it is desired, for example, to maintain the pressure within the reactor 11 very close to a set point !pressure as determined by a main computer 14 connected to the control subassembly 13, the pressure transducer will signal both the main computer 14 and control subassembly 13 that an appropriate corrective signal produced by control subassembly 13 be fed to the servo-amplifier 15. The actual pressure signal is also fed to servo-amplifier 15 which develops from them both a signal which is applied to the driving mechanism of back-pressure valve 17 to regulate the valve 17 so that the pressure in the reactor 11 will attain the desired magnitude. Heat is shown as being applied to valve 17 to prevent condensation of heavier molecular weight gases in the valve 17 and its connecting fittings.

Figure 3:
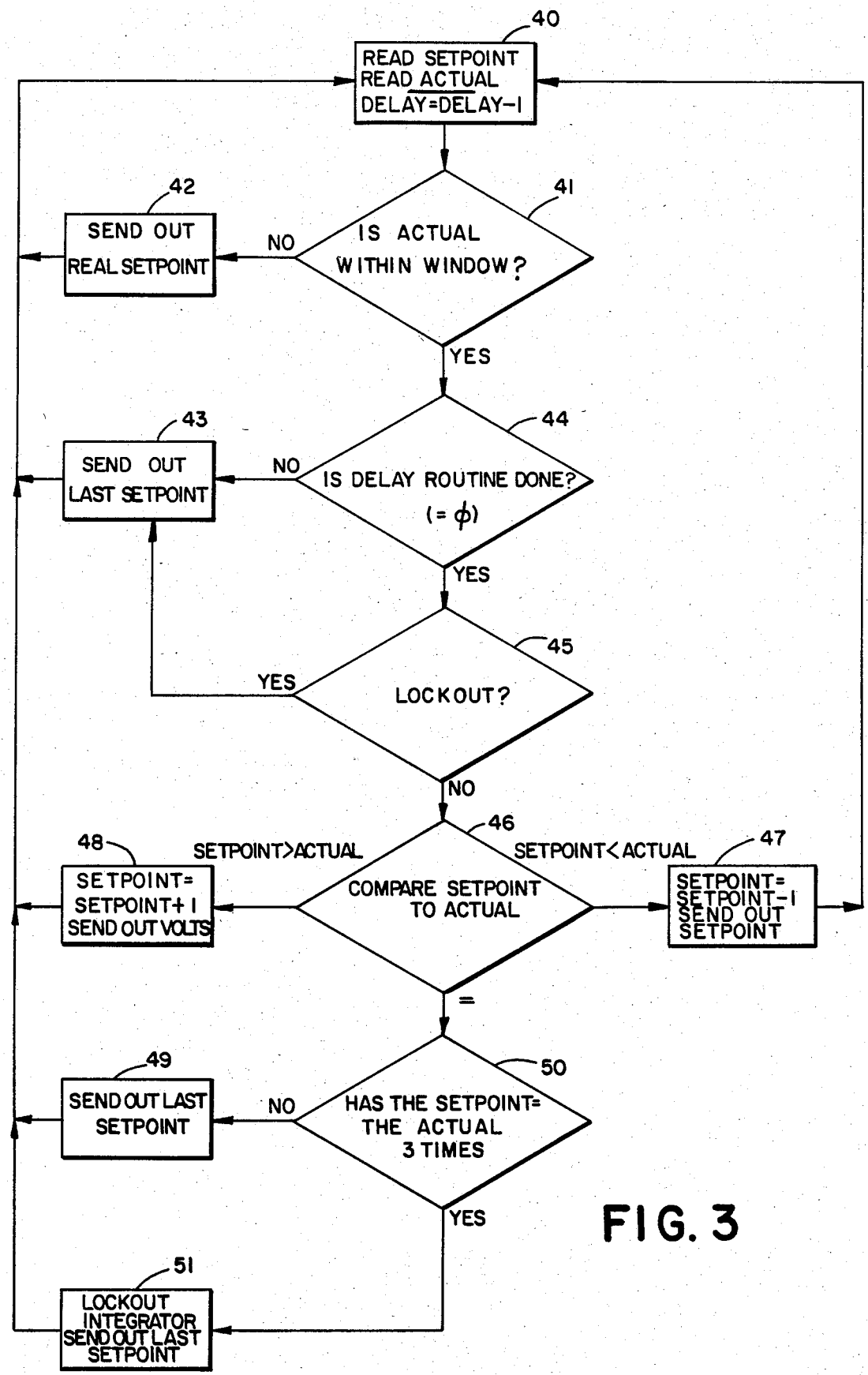
FIG. 3 is a flow diagram for software used in the general system in which this invention is embodied.

FIG. 3 is a flow diagram showing how the program stored within EPROMs Z8–Z12 controls the processing by subassembly 13 of the desired set-point signal from the main computer 14 and the actual pressure-representative signal from transducer 12 to derive a modified set-point signal that is applied to the input of the servo-amplifier 15 (FIG. 2). The microprocessor recalls from RAM (Z4) the two digital signals representing the desired set point and the signal representing the actual pressure as measured by transducer 12. In the loop comprising instruction 40, decision 41, and instruction 42, a delay is intentionally introduced to compensate for the time required for the microprocessor to integrate the error between the actual pressure signal and the desired set point signal as will be explained later.

Without a prepressure valve 16 in the overall system of FIG. 2, the program would proceed from instruction 40 to decision block 41. However, since a prepressure valve is actually used, a subroutine (not shown) is preliminarily employed at this point. It involves, first, a decision as to whether the actual pressure signal represents a pressure that is less than the desired set-point pressure from the computer by more than 50 pounds. Thus, if the actual signal represents only 145 pounds, whereas the main computer is calling for 200 pounds, the answer to the question or decision would "yes". In that case, the subroutine would continue onto an instruction block, i.e., "OPEN PRE-PRESSURE VALVE" and microprocessor Z1 would produce an output signal that would open valve 16. From there the subroutine would continue by by-passing decision block 41 and proceeding to the instruction in block 42. Accordingly, block 42 would send a signal to the pre-pressure valve commanding it to open. Had the answer to the decision been "no", the subroutine would have been followed by the decision within decision block 41.

In block 41, there is a different question: Is the measured actual pressure within a "window" of ±20 pounds of the desired set point from the main computer? If the answer is "no", the signal representing the desired set point of, say 200 psi, is sent again to the microprocessor where it is read again together with the actual pressure signal. If the answer is "yes", the next question in decision block 44 is then asked: Has the predetermined delay introduced in the loop above it been accomplished? The answer is determined by reference to a count-down counter to see whether the processing of the loop comprising 40, 41 and 42 (with the pre-pressure subroutine) has been repeated the requisite number of times. If the answer is "no", the previous set point signal is again applied to the input of the servo amplifier. Usually this previous set point signal is a signal representing the original set point as modified by a later step. If the answer is "yes", the next decision in block 45 is made. That block essentially asks the question: Was the integrator locked out or rendered inoperative as a result of the previous processing of the desired and actual set point signals according to the flow diagram? The only condition for lock out is if the actual pressure has equalled the desired set point pressure for three consecutive time slots. In hardware terms, the answer would be found in a certain location in the RAM (Z4) which would be scanned to see whether the bits there represented a low or high number. If it represented a high number, the integration would have been discontinued; if low, it is still functioning. The decision in step 45 is taken so as to avoid subsequent comparison (block 46) if lock-out had already occurred. In that case, the next instruction would be the one in block 43, i.e., send out the previous set point, usually a modified set point. If the answer to the decision in block 45 is "no", this means that the set point has not equalled the actual three successive sampling times and so the next step must be taken. Decision block 46 requests comparison of the desired set point to the actual set point. If the two are equal to one another as a result of prior processing, the next decision 50 must be made. If the set point signal is lower than the actual pressure signal, the set point signal receives a voltage increment of 1 unit and this is sent out to the servo amplifier. Conversely, if the set point signal is greater than the actual pressure signal, the set point signal is decreased by one unit and it is sent out to the servo amplifier.

If the set point and actual pressures are equal, the question then becomes in decision block 50 as to whether the desired point and the actual pressure signals have been equal in three successive time slots. The condition of triple equivalence was imposed on the system so as to reduce possible error that might accidentally lock out the integrator. If the answer to the decision in block 50 is "no", the previous modified set point signal is sent out again to the servo amplifier and the integrator continues to perform. If the answer is "yes", the integrator is locked out and the previous modified set point signal is again sent out to the servo amplifier to control the valve 17. Were it not for this triple test, the arrival of an error signal immediately at the back pressure valve 17 before the latter equilibrated could cause even more instability in it.

FIG. 4 is a simplified block diagram which is intended merely to show general signal paths between the blocks. In many instances, although only one line may be shown, that line may represent many parallel lines between indicated lettered terminals.

FIG. 4 shows a control subassembly 13 or input-output processor which has proved highly successful in the present invention. In explaining its operation on the two input signals at its input terminals, the following will first consider its processing of the set point signal from main computer 14 that appears at terminal 60. This desired set point analog signal, for example, one generated as part of a programmed test procedure, is applied via input terminal 60 to terminal a of the analog multiplexer Z16. If desired, this signal may be amplified before application to multiplexer Z16 by an amplifier (not shown). Z16 is so constructed that it will transfer to comparator Z15 from its terminal c, when so instructed, the desired set point voltage from terminal 60 (or the actual pressure-representative analog signal from terminal 61) as a function of a voltage appearing on its terminal d. That terminal is connected to receive the output signal at the terminal e of the programmed peripheral interfacer Z5. The signal at terminal d is in one of two states, either high or low. In one state, it enables the set-point signal at terminal a of Z16 to be so transferred (in the other it enables the actual pressure signal at terminal b to be so transferred.)

The output signal of the multiplexer Z16 at terminal c is applied to one input of comparator Z15. There is also a reference analog voltage applied to the other input of comparator Z15 from digital-analog converter Z17 at its output terminal a. If the reference voltage is greater than the voltage on the other input, the output of Z15 is low, i.e., 0 volts, whereas if the opposite is the case, the output of the comparator is high, i.e., 5 volts. This process is conventional "successive approximation".

The digitized signal at the output of the comparator Z15 is applied to terminal e of Z4's input/output section which transfers it via output terminals c to the microprocessor Z1. This digital signal informs the microprocessor that the amplitude of the signal received from the output of comparator Z15 either exceeds or is lower than the particular voltage from terminals 60, 61 then being processed.

The microprocessor Z1 will process this signal in accordance with instructions that are in the EPROMs Z8-Z12. If the received digital voltage is too high or too low, the microprocessor will send out a corresponding signal to terminals c', c" of the peripheral interfacer Z5 which sends it along to the digital-analog coverter Z17 from output d of Z5. On receipt of this signal, Z17 will send a new voltage out at its terminal a to be supplied to one input terminal of comparator Z15. This process is repeated twelve times to assure that the correct digital voltage is in the microprocessor.

After the above-described processing of the input analog set-point signal received from the main computer, the processed signal, in two groupings of 8-bits each, is sent in two operations to the RAM (Z4) from terminals c of Z1 to terminals c of the RAM (Z4). The locations in the RAM have previously been selected by signals from the Z6 memory decode chip. Then a "write" signal is sent from terminal d on Z1 to terminal a of Z4 to latch the processed input-set-point signal in the RAM.

The interfacer Z5 then sends a signal from its terminal e to input terminal d of multiplexer Z16 to enable the actual pressure signal at its terminal b to be read. That signal at input terminal 61 is then processed in the same way as was the desired set-point analog signal at terminal 60 and also is latched into the RAM. The processing by the microprocessor Z1 of both input signals is the instruction step shown in box 40 of FIG. 3.

Once both processed input signals have been stored in the RAM, they can then be compared and evaluated by the microprocessor to produce, if necessary, a modified set-point signal. That signal will be sent to the servo amplifier 15 which will then derive an error signal. The error signal is then used to energize the electrical drive of the back-pressure valve 17 so that the actual pressure in the reactor 11 will be within 1 pound of the set point pressure ordered by the main computer 14.

In order for the microprocessor Z1 to begin its comparison of the two signals in the RAM, a memory decode signal is issued to Z1 to generate a "read" signal. The latter signal is transferred from terminal a of Z1 to terminal d of the RAM Z4. The two stored signals are transferred to terminals c of Z1 from terminals c of Z4. Microprocessor Z1 then processes those two signals under the control of the program stored in Z8–Z12, following the general flow diagram previously set out in FIG. 3 and discussed previously. The upshot of this processing is that modified set-point signals are sent out to the servo-amplifier 15 to energize the back-pressure regulating valve in such a way that it operates to keep the pressure in the system within the one pound tolerance.

The upper address chip Z2 has a number of address lines which communicate between its input terminals a and terminals g of microprocessor Z1. Z2 is a short term memory chip and it has a number of connections from terminable to memory decode chip Z6 at the latter's terminals a. It also has connections from terminals d to terminals c of the EPROM Z12.

Lower address chip Z3 is also a short term memory which also has a number of address lines between its terminals a and terminals c of microprocessor Z1. Actually, Z2 and Z3 and their address line communications with microprocessor Z1 do partially time-share address information with data bits. T:is is accomplished by a communicating line between terminal f of Z1 and terminals c and d of Z2 and Z3. When address bits are sent out between the microprocessor and the upper and lower address chips, a so-called ALE (address latching enable) signal appears at terminal f of microprocessor Z1 and is applied to terminal c of Z2 and terminal d of Z3. This causes both Z2 and Z3 to latch with address information. The address bits can be sent to the decoders Z6, Z7 and to the EPROMs via the connections from some of the terminals c of Z2 to corresponding terminals of the EPROM Z12. Also, address information is enabled to be transferred from terminals c and b of lower address Z3 to terminals c of Z12. Data bits can then come out of Z12 onto the data bus.

Z6 and Z7 are identical chips, Z6 being for memory decode purposes and Z7 for input/output purposes. Z6 has a connection at terminal c to one input of gate Z37 that may consist of, for example, inverting gates which are in series. The output of gate Z37 is applied to terminal g of Z4 and the signal at that terminal selects or enables Z4 to operate rather than one of the EPROMs Z8–Z12. An output signal at terminal d of Z6 is applied to EPROM Z8 at its terminal b when that EPROM is to be selected.

Decode chip Z7 decodes bits on address lines appearing at its terminals b to enable selected ones of the other components of the system to operate. There is also a connection between terminal d of Z7 and terminal j of interfacer Z5. On this connecting line, a chip select signal can be transferred to enable Z5 to transfer information to Z17, or to drive displays Z27–Z37, or to enable the sample and hold amplifiers Z21, Z23 via Z17. At terminal c of chip Z7, a signal appears that is applied to the other input of gate 37. Gate Z37 is so constructed that either one of the two inverting gates (7400) will produce an output signal that is applied to terminal g of RAM Z4. If a signal is supplied to the gate from terminal c of Z7, Z4 will be selected. Also, if a signal at c on chip Z6 is applied to gate Z37, Z4 will be selected by a signal appearing at its terminal g. When Z4 has been so selected, it comes on the bus which all of the chips share as a common data line. The data bus, of course, enables the microprocessor Z1 to communicate with all other components, which component at which particular time being controlled mainly by the decoders.

The microprocessor Z1 also produces a signal at its terminal e which is applied to terminal h of RAM Z4 and to terminals b and a of decode chips Z6 and Z7. This line is for enabling either Z6 or Z7 to process subsequent signals which relate to input/output activity or to memory activity. If the signal on this line is high, input/output activity is going to happen and Z7 will be enabled. When the signal is low, memory activity is going to happen and it is Z6 which will be enabled.

The input/output decoder Z7 can have up to eight 8-bit input/output ports, each being 8 bits. These are from the eight address lines at the terminals b and c of lower address chip Z3 and enable additional output signals therefrom to be processed.

The signal appearing at terminal a of converter Z17 is also applied (amplified if necessary) to amplifiers Z21, Z23 at terminal b thereof. To the same amplifiers at input terminal a, a signal appearing at terminal f of interfacer Z5 is also applied. The latter signal is an enable signal which permits the signal from Z17 to be processed in so-called "sample and hold" amplifier Z21. This type of amplifier, in conjunction with an associated capacitor, stores the amplified signal for a predetermined time so that the microprocessor Z1 can be operative doing other routines in the meanwhile. The stored and amplified signal is then applied to an amplifier Z23 and fed therefrom to an output terminal 80 to which servo-amplifier 15 is connected. This signal when applied to the servo-amplifier brings the back-pressure valve 17 to a state in which the pressure within the reactor is within one pound of the nominal set-point pressure as determined by the main computer.

The stored and amplified signal at terminal 80 is also applied to another amplifier, which may be a part of amplifier Z23, then clamped, and then applied to the input terminal of a transistor Q2 whose output is applied to output terminal 81. That terminal is connected to the pre-pressure valve 16 which is either on or off depending upon the conduction state of transistor Q2. Since the flow rate of the system is extremely low, the pre-pressure valve is ordinarily used only at system start-up; otherwise it would take too long to achieve the desired initial pressure. When the valve 16 is opened, it will quickly increase the pressure to the reactor to bring it within 50 pounds, for example, of the nominal set-point pressure called for by the main computer. Once it is within that range, it is disabled by the absence of the enable signal from terminal f of interfacer Z5.

The microprocessor is shown working in conjunction with 5 EPROMs, but that many are only required if the program stored in them needs that many memory locations.

The signals appearing at terminals i of interfacer Z5 are applied to display drivers Z27–Z31 which are decoder drivers for respective BCD 7-segment displays Z40–Z44 that present five digits for viewing. Intermediate current-limiting resistor networks may be employed between respective ones of the drivers and displays.

As part of the present application, a listing (see Appendix) is attached showing both the main program and six subroutines, all in Intel 8085 assembly language. Reference at the top of some of the pages to "Makro assembler AMA.2" is to the name of the assembler used in deriving the listing. There are approximately four fan-fold pages with the main program and the rest of the enclosure, as stated therein, concerns six sets of instructions or subroutines, viz., INITIALIZE, VIN, SWAIT, SAMOUT, CVERT, and DISPLAY. They describe, the purposes as follows:

INITIALIZE—Instructions upon first starting the operation of the system in any given run.

VIN—Reading of all voltages into the microprocessor.

SWAIT—Slows the microprocessor to keep its pace with the lower rate of the hardware.

SAMOUT—Sends enable signal voltages to sample and hold amplifiers (Z21, Z23. in FIG. 4). It also controls generation of voltages to be stored in the amplifiers.

CVERT—Mathematical conversion routine for display units involved.

DISPLAY—Takes the converted data from the CVERT subroutine and actuates the drivers accordingly.

The place on the listing where each subroutine begins can be found in the third column under the name of the subroutine.

It should be understood that instead of using the "successive approximation" method to digitize the incoming analog signals, resort could be had to digital analog-digital converters. However, it has been found that use of the successive approximation method is not only considerably faster, but also is cheaper than using converters.

Also, while the invention has been described in terms of desired set points being programmed by a main computer 14, it should be understood that the present system is not dependent upon the use of a main frame. It would work equally as well with processing of a voltage representing a desired set point which is produced by a voltage-divider network, for example, or other apparatus that may be manually operated.

PARTS LIST

Z1 8085 Microprocessor (Intel)
Z2 8212 Short term memory
Z3 8212 Short term memory
Z4 8155 RAM+Digital I/O (+Timer)
Z5 8255 Programmable Peripheral Interfacer
Z6 74LS138 Memory Decode
Z7 74LS138 I/O Decode
Z8–Z12 2716 EPROM
Z15 CMP-01 High Speed Comparator
Z16 4051 Multiplexer
Z17 7580VS Digital-Analog Converter
Z21 LF398H Amplifier
Z23 1458 Amplifier
Z27–Z31 4511 Decoding display driver
Z37 7400 Inverting gate

```
MAKRO ASSEMBLER AMA.2    Appendix              MAIN PROGRAM

0000            ; 1/14/82         SML
0000                              TITLE     'PRESSURE A-2 10/30/81'
0000   31C830                     LXI       SP,STACK
0003   CD0010                     CALL      INITIALIZE
0006   3E03                       MVI       A,EQTIME
0008   321A30                     STA       LOCKOUT
000B   AF                         XRA       A
000C   321B30                     STA       LOCKFLOP ; OFFH= LOCKOUT INTERATOR
000F   320530                     STA       OFFSET
0012   320730                     STA       SIGN ; 0="+"
0015   320630                     STA       OFFSETH
0018   CD0910         MAIN        CALL      VIN ; READ INPUT VOLTAGES
001B   CD3E00                     CALL      PREPRESS
001E   CD7400                     CALL      INTEGRATE; INTEGRATE ONLY IN PRESSURE WINDOW(+ OR -) 1-13-82
0021                             ; INTEGRATE RETURNS WITH SETPT(OUT) IN HL
0021   221130                     SHLD      SAMP1L; 12-10-81
0024   CD0310                     CALL      SAMOUT
0027   2A1130                     LHLD      SAMP1L
002A                             ; DISPLAY SETPOINT GOING OUT
002A   7C                         MOV       A,H
002B   37                         STC
002C   3F                         CMC
002D   1F                         RAR
002E   67                         MOV       H,A
002F   7D                         MOV       A,L
0030   1F                         RAR
0031   6F                         MOV       L,A
0032   220330                     SHLD      BINL
0035   CD0C10                     CALL      CVERT
0038   CD0F10                     CALL      DISPLAY
003B   C31800                     JMP       MAIN
003E                              LINK      LAB
003E           PREPRESS
003E                             ;REQUIRES VIN2L AND VIN1L VALID MEMORY
003E                             ;RETURNS WITH PREPRESS BOOST ON OR OFF SET
003E                             ;IF IN BAND OF WINDOW PREPRESS REMAINS THE SAME
003E                             ;SAMP1L&H WILL OUTPUT PREVIOUS SETTING
003E   2A1730                     LHLD      VIN2L
0041   116400                     LXI       D,WINDOW
0044   19                         DAD       D ;ADD WINDOW TO ACTUAL PRESSURE
0045   EB                         XCHG      ;ACT+WINDOW IN DE
```

```
0046  2A1530            LHLD    VIN1L
0049  CD6E00            CALL    COMP16
004C  D25D00            JNC     ONPRPS
004F  2A1530            LHLD    VIN1L
0052  EB                XCHG
0053  2A1730            LHLD    VIN2L
0056  CD6E00            CALL    COMP16
0059  D26600            JNC     OFFPRS
005C  C9                RET
005D  3EFF      ONPRPS  MVI     A,0FFH
005E  321330            STA     SAMP2L
0062  321430            STA     SAMP2H
0065  C9                RET
0066  AF        OFFPRS  XRA     A
0067  321330            STA     SAMP2L
006A  321430            STA     SAMP2H
006D  C9                RET
      PRESSURE A-2 10/30/81
006E  7C        COMP16  MOV     A,H
006F                    ;COMPARES HL TO DE
006F                    ;RETURNS WITH FLAGS SET
006F                    ; IF CARRY IS SET THEN DE>HL
006F  BA                CMP     D
0070  C0                RNZ
0071  7D        LOWBYTE MOV     A,L
0072  BB                CMP     E
0073  C9                RET
0074                    ;VIN1L=SETPOINT   VIN2L=ACTUAL
0074  2A1530    INTEGRATE LHLD  VIN1L
0077  110000            LXI     D,0
007A  CD6E00            CALL    COMP16 ; IF SETPT=0 THEN SEND 0 AND LOCK OUT INTEGRATOR
007D  CA3901            JZ      OMIT
0080  11B80B            LXI     D,1500*2 ; IF SETPT=>1500 THEN SEND 1500 AND LOCK OUT INEGRATOR
0083  CD6E00            CALL    COMP16
0086  D23901            JNC     OMIT
0089  2A1730            LHLD    VIN2L ; IF SETPT=ACTUAL THEN "EQUIV"
008C  EB                XCHG
008D  2A1530            LHLD    VIN1L
0090  CD6E00            CALL    COMP16
0093  CA0D01            JZ      EQUIV
0096  11D8FF            LXI     D,1+~PWINDOW ; IF SETPT-20>ACTUAL THEN OMIT
0099  2A1530            LHLD    VIN1L
009C  19                DAD     D
009D  EB                XCHG
009E  2A1730            LHLD    VIN2L
00A1  CD6E00            CALL    COMP16
00A4  DA3901            JC      OMIT
00A7  2A1530            LHLD    VIN1L ; IF SETPT>ACTUAL THEN NEG
00AA  EB                XCHG
00AB  2A1730            LHLD    VIN2L
00AE  CD6E00            CALL    COMP16
00B1  DAE900            JC      NEG
00B4  112800            LXI     D,PWINDOW ; IF SETPOINT+PWINDOW<ACTUAL THEN OMIT
00B7  2A1530            LHLD    VIN1L
00BA  19                DAD     D
00BB  EB                XCHG
00BC  2A1730            LHLD    VIN2L
00BF  CD6E00            CALL    COMP16
00C2  D23901            JNC     OMIT
00C5                    ;VIN1L=SETPOINT   VIN2L=ACTUAL
00C5  3A1B30    POS     LDA     LOCKFLOP ; OFFH= LOCKOUT INTERATOR
00C8  FE00              CPI     0
00CA  C23501            JNZ     LOCKED
00CD  3A1930            LDA     SETDELAY ; THIS DELAY WAITS FOR SYSTEM TO EQUILIBRATE
00D0  3D                DCR     A ;        BEFORE ANOTHER CHANGE IS MADE
00D1  321930            STA     SETDELAY
00D4  FE00              CPI     0
00D6  C23501            JNZ     LOCKED
00D9  2A0530            LHLD    OFFSET
00DC  2B                DCX     H ; SUBTRACT 1 FROM SETPOINT(OUT)
00DD  220530            SHLD    OFFSET
00E0  EB                XCHG
00E1  2A1530            LHLD    VIN1L
00E4  19                DAD     D
00E5  221C30            SHLD    STABLE
00E8                    ;MVI A,NEW DELAY(ONLY IF SHORTER DELAY THAN 255 IS NEEDED)
00E8                    ;STA SETDELAY
00E8  C9                RET
      PRESSURE A-2 10/30/81
00E9                    ;VIN1L=SETPOINT   VIN2L=ACTUAL
00E9  3A1B30    NEG     LDA     LOCKFLOP ; OFFH= LOCKOUT INTERATOR
00EC  FE00              CPI     0
00EE  C23501            JNZ     LOCKED
00F1  3A1930            LDA     SETDELAY ; THIS DELAY WAITS FOR SYSTEM TO EQUILIBRATE
00F4  3D                DCR     A ;        BEFORE ANOTHER CHANGE IS MADE
00F5  321930            STA     SETDELAY
00F8  FE00              CPI     0
00FA  C23501            JNZ     LOCKED
00FD  2A0530            LHLD    OFFSET
0100  23                INX     H ;ADD 1 TO SETPOINT(OUT)
0101  220530            SHLD    OFFSET
0104  EB                XCHG
0105  2A1530            LHLD    VIN1L
0108  19                DAD     D
0109  221C30            SHLD    STABLE
010C                    ;DELAY
010C  C9                RET
010D  3A1B30    EQUIV   LDA     LOCKFLOP ; OFFH= LOCKOUT INTERATOR
0110  FE00              CPI     0
0112  C23501            JNZ     LOCKED
0115  3A1930            LDA     SETDELAY ; THIS DELAY WAITS FOR SYSTEM TO EQUILIBRATE
0118  3D                DCR     A ;        BEFORE ANOTHER CHANGE IS MADE
0119  321930            STA     SETDELAY
```

```
011C FE00                CPI      0
011E C23501              JNZ      LOCKED
0121 3A1A30              LDA      LOCKOUT ; # OF TIMES FOR SETPOINT TO EQUAL ACTUAL BEFORE LOCKOUT
0124 3D                  DCR      A
0125 321A30              STA      LOCKOUT
0128 FE00                CPI      0
012A C23501              JNZ      LOCKED
012D 3EFF                MVI      A,0FFH
012F 321B30              STA      LOCKFLOP ; 0FFH= LOCKOUT INTERATOR
0132 320730              STA      SIGN ; CHANGE SIGN TO "-"
0135 2A1C30   LOCKED     LHLD     STABLE ; THIS PREVENTS 1 BIT BOBLE
0138 C9                  RET
0139 2A1530   OMIT       LHLD     VIN1L ; NOT IN WINDOW SEND SETPOINT STRAIGHT OUT
013C 221C30              SHLD     STABLE
013F 3E03                MVI      A,EQTIME ; RESET LOCKOUT COUNTER
0141 321A30              STA      LOCKOUT
0144 AF                  XRA      A ; ENABLE INTEGRATOR
0145 321B30              STA      LOCKFLOP ; 0FFH= LOCKOUT INTERATOR;0FFH LOCKS OUT INTEGRATER
0148 320730              STA      SIGN
014B 320530              STA      OFFSET
014E 320630              STA      OFFSETH
0151 C9                  RET
0152 7C       TWOSCOMP16 MOV      A,H ; RETURNS WITH 2'S COMPLIMENT OF HL IN HL
0153 2F                  CMA
0154 67                  MOV      H,A
0155 7D                  MOV      A,L
0156 2F                  CMA
0157 6F                  MOV      L,A
0158 110100              LXI      D,1
015B 19                  DAD      D
015C C9                  RET
015D AF       ROTAT16    XRA      A ; RETURNS WITH HL/2 IN HL
015E 7C                  MOV      A,H
015F 1F                  RAR
0160 67                  MOV      H,A
0161 7D                  MOV      A,L

PRESSURE A-2 10/30/81
0162 1F                  RAR
0163 6F                  MOV      L,A
0164 C9                  RET
?
LAB
LAB,2

0165              ; 1/14/82
0165                      LIST

MAKRO ASSEMBLER AMA.2

0000              ;NOLST
0000              ;10/30/81
0000              ;THIS CONTAINS THE I/O REQUIRED TO RUN THE I/O PROCESSOR.
0000              ;INITIALIZE--CONTAINS ALL PIA INITIALIZATION
0000              ;SAMOUT--BOTH ANALOG CHANNELS OUT DATA IS TO BE IN SAMP1L&SAMP1H(CH1)
0000              ;         AND SAMP2L&SAMP2H(CH2) PRIOR TO CALLING SAMOUT
0000              ;SWAIT--THIS IS A SHORT DELAY ROUTINE IT USES THE A REGISERS DELAY IS
0000              ;       DETRMINED BY THE "DELAY" VARIABLE(DETERMINED AT ASSEMBLY)
0000              ;VIN--AFTER CALLING THIS ROUTINE DATA FOR EACH CHANNEL WILL BE IN
0000              ;        VIN1L&VIN1H(CH1) AND VIN2L&VIN2H(CH2)
0000              ;CVERT--THIS ROUTINE CONVERTS BINARY DATA FROM BINL,BINH TO BCD
0000              ;        STORED IN THOUS,HUNS,TENS,UNITS(USES A&B REGISTERS)
0000              ;DISPLAY--CALLING THIS ROUTINE TAKES BCD DATA FROM THOUS,HUNS,TENS,& UNITS
0000              ;        AND DISPLAYS IT.SIGN IS DETERMINED BY LOCATION SIGN(00=+,FF=-)
0000              ;        DPCOUNT LOCATION WHERE DECIMAL(S) TO BE DISPLAYED IS STORED LOW
0000              ;        NIBBLE IS USED
0000 C31200  JMP1         JMP      INITIALIZE
0003 C37D00  JMP2         JMP      SAMOUT
0006 C33D00  JMP3         JMP      SWAIT
0009 C34A00  JMP4         JMP      VIN
000C C3B101  JMP5         JMP      CVERT
000F C3B000  JMP6         JMP      DISPLAY
0012         INITIALIZE   ENTRY
0012 3E80                 MVI      A,PORT1SET
0014 D303                 OUT      X1 ;A OUT,B OUT,C OUT
0016 3E01                 MVI      A,1
0018 D308                 OUT      X2 ;A OUT,B IN
001A 3EFF                 MVI      A,0FFH
001C D309                 OUT      A2 ;ZERO DAC
001E 320E30               STA      A2ST ;STORE PORT IMAGE
0021 D302                 OUT      C1
0023 320230               STA      C1ST ;STORE PORT IMAGE
0026 AF                   XRA      A ;CLEAR RAM
0027 320E30               STA      THOUS
002A 320B30               STA      HUNS
002D 320C30               STA      TENS
0030 320D30               STA      UNITS
0033 320030               STA      A1ST
0036 320130               STA      B1ST
0039 321030               STA      B2ST
003C C9                   RET
003D         SWAIT        ENTRY
003D E5                   PUSH     H ;SAVE HL ON STACK,KEEP TRANSPARENT
003E AF                   XRA      A ;CLEAR A
003F 2160EA               LXI      H,DELAY ;LOAD H WITH DELAY
0042 2B       WAIT1       DCX      H ;KEEP DECREMENTING UNTIL ZERO
0043 7C                   MOV      A,H
0044 B5                   ORA      L
0045 C24200               JNZ      WAIT1
0048 E1                   POP      H ;IF ZERO,RETORE HL AND RETURN
0049 C9                   RET
```

| Addr | Code | Label | Op | Operand | Comment |
|---|---|---|---|---|---|
| 004A | | VIN | ENTRY | | |
| 004A | | | ;THIS ROUTINE READS IN BOTH CHANNELS AND OUT PUTS THEM TO VIN1L,H&VIN2L,H | | |
| 004A | 3A0130 | | LDA | B1ST | |
| 004D | E6DF | | ANI | CH1ON | ;SET MUXER TO READ CHANNEL 1 |
| 004F | 320130 | | STA | B1ST | |
| 0052 | D301 | | OUT | B1 | |
| 0054 | CD6102 | | CALL | MATOD | ;CONVERT A TO D |

MAKRO ASSEMBLER AMA.2

| Addr | Code | Label | Op | Operand | Comment |
|---|---|---|---|---|---|
| 0057 | 3A0A30 | | LDA | DACVH | ;TAKE DATA AND STORE IN CH1 LOCATIONS |
| 005A | 321630 | | STA | VIN1H | |
| 005D | 3A0930 | | LDA | DACVL | |
| 0060 | 321530 | | STA | VIN1L | |
| 0063 | 3A0130 | | LDA | B1ST | |
| 0066 | F620 | | ORI | CH2ON | ;TURN ON MUXER TO CHANNEL 2 |
| 0068 | 320130 | | STA | B1ST | |
| 006B | D301 | | OUT | B1 | |
| 006D | CD6102 | | CALL | MATOD | ;CONVERT A TO D |
| 0070 | 3A0A30 | | LDA | DACVH | ;TAKE DATA AND STORE IN CH2 LOCATIONS |
| 0073 | 321830 | | STA | VIN2H | |
| 0076 | 3A0930 | | LDA | DACVL | |
| 0079 | 321730 | | STA | VIN2L | |
| 007C | C9 | | RET | | |
| 007D | | SAMOUT | ENTRY | | |
| 007D | | | ;VOLTAGE TO BE SENT TO THE S&H'S IS STORED IN SAMP1H,SAMP1L,SAMP2H,SAMP2L | | |
| 007D | | | ;THIS ROUTINE TAKES CARE OF PULSING THE S&H'S AND SENDING THE DATA TO THE | | |
| 007D | | | ;DAC WHICH GOES TO THE S&H'S. | | |
| 007D | 3A1230 | | LDA | SAMP1H | ;GET SAMPLE CH1 HIGH DATA |
| 0080 | 2F | | CMA | | ;DAC HAS INVERTED INPUTS ;DAC HAS INVERTED INPUTS |
| 0081 | E60F | | ANI | 0FH | ;MASK OUT UNUSED BITS |
| 0083 | 320E30 | | STA | A2ST | |
| 0086 | D309 | | OUT | A2 | ;SEND DATA TO DAC |
| 0088 | 3A1130 | | LDA | SAMP1L | ;GET SAMPLE CH1 LOW DATA |
| 008B | 2F | | CMA | | ;DAC HAS INVERTED INPUTS |
| 008C | 320230 | | STA | C1ST | |
| 008F | D302 | | OUT | C1 | ;SEND REST OF DATA TO DAC |
| 0091 | 0E80 | | MVI | C,80H | |
| 0093 | CD8003 | | CALL | SAMPL | |
| 0096 | 3A1430 | | LDA | SAMP2H | ;GET SAMPLE CH2 HIGH DATA |
| 0099 | 2F | | CMA | | ;DAC HAS INVERTED INPUTS |
| 009A | E60F | | ANI | 0FH | ;MASK OUT UNUSED BITS |
| 009C | 320E30 | | STA | A2ST | |
| 009F | D309 | | OUT | A2 | ;GET SAMPLE CH2 LOW DATA |
| 00A1 | 3A1330 | | LDA | SAMP2L | |
| 00A4 | 2F | | CMA | | ;DAC HAS INVERTED INPUTS |
| 00A5 | 320230 | | STA | C1ST | |
| 00A8 | D302 | | OUT | C1 | |
| 00AA | 0E40 | | MVI | C,40H | |
| 00AC | CD8003 | | CALL | SAMPL | |
| 00AF | C9 | | RET | | |
| 00B0 | | DISPLAY | ENTRY | | |
| 00B0 | F5 | | PUSH | PSW | ;IN THOUS,HUNS,TENS,UNITS,S1=SIGN |
| 00B1 | 3A0D30 | LSB | LDA | UNITS | |
| 00B4 | F6F0 | | ORI | 0FOH | |
| 00B6 | D300 | | OUT | A1 | |
| 00B8 | 3A0130 | | LDA | B1ST | |
| 00BB | E6FE | | ANI | S50N | |
| 00BD | D301 | | OUT | B1 | |
| 00BF | F601 | | ORI | S50FF | |
| 00C1 | D301 | | OUT | B1 | |
| 00C3 | 320130 | | STA | B1ST | |
| 00C6 | 3A0C30 | LSB2 | LDA | TENS | |
| 00C9 | F6F0 | | ORI | 0FOH | |
| 00CB | D300 | | OUT | A1 | |
| 00CD | E67F | | ANI | S40N | |
| 00CE | D300 | | OUT | A1 | |
| 00D1 | F6F0 | | ORI | 0FOH | |
| 00D3 | D300 | | OUT | A1 | |
| 00D5 | 3A0B30 | LSB3 | LDA | HUNS | |

MAKRO ASSEMBLER AMA.2

| Addr | Code | Label | Op | Operand | Comment |
|---|---|---|---|---|---|
| 00D8 | F6F0 | | ORI | 0FOH | |
| 00DA | D300 | | OUT | A1 | |
| 00DC | E6BF | | ANI | S30N | |
| 00DE | D300 | | OUT | A1 | |
| 00E0 | F6F0 | | ORI | 0FOH | |
| 00E2 | D300 | | OUT | A1 | |
| 00E4 | 3A0F30 | MSB | LDA | THOUS | |
| 00E7 | F6F0 | | ORI | 0FOH | |
| 00E9 | D300 | | OUT | A1 | |
| 00EB | E6DF | | ANI | S20N | |
| 00ED | D300 | | OUT | A1 | |
| 00EF | F6F0 | | ORI | 0FOH | |
| 00F1 | D300 | | OUT | A1 | |
| 00F3 | | | ; DPOINT:LDA DPCOUNT; ****************THIS IS FOR DECIMAL DISPLAY | | |
| 00F3 | | | ; ANI 1 ; **************NOT COMPLETED********************* | | |
| 00F3 | | | ; CZ DP1 ; ******************************************************* | | |
| 00F3 | | | ; LDA DPCOUNT | | |
| 00F3 | | | ; ANI 2 | | |
| 00F3 | | | ; CZ DP2 | | |
| 00F3 | | | ; LDA DPCOUNT | | |
| 00F3 | | | ; ANI 4 | | |
| 00F3 | | | ; CZ DP3 | | |
| 00F3 | | | ; LDA DPCOUNT | | |
| 00F3 | | | ; ANI 8 | | |
| 00F3 | | | ; CZ DP4 | | |
| 00F3 | | | ; JMP DSIGN | | |
| 00F3 | | | DP1 | | |
| 00F3 | 3A0730 | DSIGN | LDA | SIGN;00=(+)FFH=(-) | |

```
00F6  FEFF              CPI     0FFH
00F8  CA0B01            JZ      NEG
00FB  3E00      POS     MVI     A,PLUS
00FD  F6F0              ORI     0F0H
00FF  D300              OUT     A1
0101  E6EF              ANI     SION
0103  D300              OUT     A1
0105  F6F0              ORI     0F0H
0107  D300              OUT     A1
0109  F1                POP     PSW
010A  C9                RET
010B  3E01      NEG     MVI     A,MINUS
010D  F6F0              ORI     0F0H
010F  D300              OUT     A1
0111  E6EF              ANI     SION
0113  D300              OUT     A1
0115  F6F0              ORI     0F0H
0117  D300              OUT     A1
0119  F1                POP     PSW
011A  C9                RET
011B                    LIST
011B              ; THIS SUBROUTINE CONVERTS A BINARY NUMBER TO BCD
011B              ; THE BINARY INPUT IS BINL (LOW BYTE) & BINH (HIGH BYTE)
011B              ; THE BCD APPEARS IN THOUS (1000),HUNS (100),TENS (10),UNITS (1)
011B      CVERT           ENTRY
011B  2A0330            LHLD    BINL
011E  AF                XRA     A,
011F  320D30            STA     UNITS
0122  320F30            STA     THOUS
0125  320C30            STA     TENS
0128  320B30            STA     HUNS
012B  7C        LOOP    MOV     A,H
```

MAKRO ASSEMBLER AMA.2
```
012C  FE00              CPI     0
012E  C23501            JNZ     COUNT
0131  7D                MOV     A,L
0132  FE00              CPI     0
0134  C8                RZ
0135  2B        COUNT   DCX     H
0136  3A0D30            LDA     UNITS
0139  3C                INR     A
013A  320D30            STA     UNITS
013D  FE0A              CPI     10
013F  C22B01            JNZ     LOOP
0142  AF                XRA     A
0143  320D30            STA     UNITS
0146  3A0C30            LDA     TENS
0149  3C                INR     A
014A  320C30            STA     TENS
014D  FE0A              CPI     10
014F  C22B01            JNZ     LOOP
0152  AF                XRA     A
0153  320C30            STA     TENS
0156  3A0B30            LDA     HUNS
0159  3C                INR     A
015A  320B30            STA     HUNS
015D  FE0A              CPI     10
015F  C22B01            JNZ     LOOP
0162  AF                XRA     A
0163  320B30            STA     HUNS
0166  3A0F30            LDA     THOUS
0169  3C                INR     A
016A  320F30            STA     THOUS
016D  C32B01            JMP     LOOP
0170              ;NOLST
0170              ;CVERT:ENTRY
0170  AF                XRA     A; CLEAR OUTPUTS
0171  320F30            STA     THOUS
0174  320B30            STA     HUNS
0177  320C30            STA     TENS
017A  3A0430            LDA     BINH; IF VALUE IS >= 512, PUT 512 IN OUTPUT
017D  E602              ANI     2
017F  CA9101            JZ      VERT4
0182  3E05              MVI     A,5
0184  320F30            STA     THOUS
0187  3E01              MVI     A,1
0189  320B30            STA     HUNS
018C  3E02              MVI     A,2
018E  320C30            STA     TENS
0191  3A0430    VERT4   LDA     BINH; IF INPUT 256 BIT IS HIGH, ADD 256 TO OUTPUT
0194  E601              ANI     1
0196  CAB101            JZ      VERT1
0199  3A0F30            LDA     THOUS
019C  C602              ADI     2
019E  320F30            STA     THOUS
01A1  3A0B30            LDA     HUNS
01A4  C605              ADI     5
01A6  320B30            STA     HUNS
01A9  3A0C30            LDA     TENS
01AC  C606              ADI     6
01AE  320C30            STA     TENS
01B1  3A0330    VERT1   LDA     BINL; IF LOWER BYTE >= 100 THEN INCREMENT THOUS & SUBTRACT 100 FROM BI
01B4              ; UNTIL BINL < 100
```

MAKRO ASSEMBLER AMA.2
```
01B4  FE64              CPI     100
01B6  DACB01            JC      VERT2
01B9  3A0F30            LDA     THOUS
```

```
01BC  3C                       INR      A
01BD  320F30    VER11          STA      THOUS
01C0  3A0330                   LDA      BINL
01C3  D664                     SUI      100
01C5  320330                   STA      BINL
01C8  C3B101                   JMP      VERT1
01CB  3A0330    VERT2          LDA      BINL; IF BINL >= 10 THEN ADD 1 TO HUNS & SUBTRACT 10 FROM BINL UNTIL
01CE                           ; BINL < 10
01CE  FE0A                     CPI      10
01D0  DAF301                   JC       VERT3
01D3  3A0B30                   LDA      HUNS
01D6  3C                       INR      A
01D7  FE0A                     CPI      10; IF TENS IS NOT LESS THAN 10, ADD 1 TO HUNS (10 TENS) AND SET TENS TO
01D9  DAE501                   JC       VER21
01DC  3A0F30                   LDA      THOUS
01DF  C601                     ADI      1
01E1  320F30                   STA      THOUS
01E4  AF                       XRA      A
01E5  320B30    VER21          STA      HUNS
01E8  3A0330                   LDA      BINL
01EB  D60A                     SUI      10
01ED  320330                   STA      BINL
01F0  C3CB01                   JMP      VERT2
01F3  3A0330    VERT3          LDA      BINL; ADD REMAINING VALUE IN BINL TO UNITS
01F6  47                       MOV      B,A
01F7  3A0C30                   LDA      TENS
01FA  80                       ADD      B
01FB  FE0A                     CPI      10; IF RESULT >=10, ADD 1 TO TENS & SUBTRACT 10 FROM UNITS
01FD  DA1B02                   JC       VERTX
0200  D60A                     SUI      10
0202  320C30                   STA      TENS
0205  3A0B30                   LDA      HUNS
0208  3C                       INR      A
0209  FE0A                     CPI      10; IF TENS >=10 THEN ADD 1 TO HUNS & SUBTRACT 10 FROM TENS
020B  DA1F02                   JC       VERTZ
020E  D60A                     SUI      10
0210  320B30                   STA      HUNS
0213  3A0F30                   LDA      THOUS
0216  3C                       INR      A
0217  320F30                   STA      THOUS
021A  C9                       RET
021B  320C30    VERTX          STA      TENS
021E  C9                       RET
021F  320B30    VERTZ          STA      HUNS
0222  C9                       RET
0223  AF        ADJUST         XRA      A
0224  320D30                   STA      UNITS
0227  3A0330                   LDA      BINL
022A  E602                     ANI      2
022C  CA3402                   JZ       VERTLD
022F  3E05                     MVI      A,5
0231  320D30                   STA      UNITS
0234  3A0330    VERTLD         LDA      BINL
0237  E601                     ANI      1
0239  CA4402                   JZ       ADJUST1
023C  3A0D30                   LDA      UNITS
023F  C603                     ADI      3
MAKRO ASSEMBLER AMA.2
0241  320D30                   STA      UNITS
0244  3A0430    ADJUST1        LDA      BINH
0247  1F                       RAR
0248  320430                   STA      BINH
024B  3A0330                   LDA      BINL
024E  1F                       RAR
024F  320330                   STA      BINL
0252  3A0430                   LDA      BINH
0255  1F                       RAR
0256  320430                   STA      BINH
0259  3A0330                   LDA      BINL
025C  1F                       RAR
025D  320330                   STA      BINL
0260  C9                       RET
0261                           ; THIS IS THE MAIN SUCCESSIVE APPROXIMATION A TO D ROUTINE
0261                           ; 12 BIT CONVERSION IS MATOD
0261                           ; 8 BIT CONVERSION IS ATOD8
0261                           ; THIS PROGRAM RETURNS A VALUE IN DACVH (HIGH BYTE) AND DACVL (LOW BYTE)
0261                           ; WHICH EQUALS THE VALUE OF THE VOLTAGE PRESENT AT THE 710 COMPARATOR INPUT
0261                           ; IN INCREMENTS OF 10 MV. 100 = 1 VOLT
0261            MATOD          ENTRY
0261  3EFF                     MVI      A,0FFH; SETS DAC TO 0 VOLTS
0263  D302                     OUT      C1
0265  D309                     OUT      A2
0267  2F                       CMA      ;DAC HAS INVERTED INPUTS
0268  320A30                   STA      DACVH
026B  3E08                     MVI      A,8
026D  2F                       CMA      ;DAC HAS INVERTED INPUTS
026E  D309                     OUT      A2
0270  2F                       CMA      ;DAC HAS INVERTED INPUTS
0271  CD5403                   CALL     J2
0274  CA7C02                   JZ       SA400
0277  3E08                     MVI      A,8
0279  320A30                   STA      DACVH
027C  3A0A30    SA400          LDA      DACVH
027F  F604                     ORI      4
0281  CD5403                   CALL     J2
0284  CA8F02                   JZ       SA200
0287  3A0A30                   LDA      DACVH
028A  F604                     ORI      4
028C  320A30                   STA      DACVH
028F  3A0A30    SA200          LDA      DACVH
0292  F602                     ORI      2
0294  2F                       CMA      ;DAC HAS INVERTED INPUTS
0295  D309                     OUT      A2
```

```
0297  2F                    CMA           ;DAC HAS INVERTED INPUTS
0298  CD5403                CALL     J2
029B  CAA602                JZ       SA100
029E  3A0A30                LDA      DACVH
02A1  F602                  ORI      2
02A3  320A30                STA      DACVH
02A6  3A0A30      SA100     LDA      DACVH
02A9  F601                  ORI      1
02AB  CD5403                CALL     J2
02AE  CAB902                JZ       ATOD8
02B1  3A0A30                LDA      DACVH
02B4  F601                  ORI      1
02B6  320A30                STA      DACVH
02B9  AF          ATOD8     XRA      A
02BA  320930                STA      DACVL
      MAKRO ASSEMBLER AMA.2
02BD  3A0A30                LDA      DACVH
02C0  2F                    CMA      ;DAC HAS INVERTED INPUTS
02C1  D309                  OUT      A2
02C3  3E80                  MVI      A,80H
02C5  CD5D03                CALL     J1
02C8  CAD002                JZ       SA40
02CB  3E80                  MVI      A,80H
02CD  320930                STA      DACVL
02D0  3A0930      SA40      LDA      DACVL
02D3  F640                  ORI      40H
02D5  CD5D03                CALL     J1
02D8  CAE302                JZ       SA20
02DB  3A0930                LDA      DACVL
02DE  F640                  ORI      40H
02E0  320930                STA      DACVL
02E3  3A0930      SA20      LDA      DACVL
02E6  F620                  ORI      20H
02E8  CD5D03                CALL     J1
02EB  CAF602                JZ       SA10
02EE  3A0930                LDA      DACVL
02F1  F620                  ORI      20H
02F3  320930                STA      DACVL
02F6  3A0930      SA10      LDA      DACVL
02F9  F610                  ORI      10H
02FB  CD5D03                CALL     J1
02FE  CA0903                JZ       SA8
0301  3A0930                LDA      DACVL
0304  F610                  ORI      10H
0306  320930                STA      DACVL
0309  3A0930      SA8       LDA      DACVL
030C  F608                  ORI      8
030E  CD5D03                CALL     J1
0311  CA1C03                JZ       SA4
0314  3A0930                LDA      DACVL
0317  F608                  ORI      8
0319  320930                STA      DACVL
031C  3A0930      SA4       LDA      DACVL
031F  F604                  ORI      4
0321  CD5D03                CALL     J1
0324  CA2F03                JZ       SA2
0327  3A0930                LDA      DACVL
032A  F604                  ORI      4
032C  320930                STA      DACVL
032F  3A0930      SA2       LDA      DACVL
0332  F602                  ORI      2
0334  CD5D03                CALL     J1
0337  CA4203                JZ       SA1
033A  3A0930                LDA      DACVL
033D  F602                  ORI      2
033F  320930                STA      DACVL
0342  3A0930      SA1       LDA      DACVL
0345  F601                  ORI      1
0347  CD5D03                CALL     J1
034A  C8                    RZ
034B  3A0930                LDA      DACVL
034E  F601                  ORI      1
0350  320930                STA      DACVL
0353  C9                    RET
0354  320E30      J2        STA      A2ST; AND STORE IMAGE
0357  2F                    CMA      ;DAC HAS INVERTED INPUTS
      MAKRO ASSEMBLER AMA.2
0358  D309                  OUT      A2; SEND DATA TO DAC UPPER BITS
035A  C36303                JMP      J12; AND DO SAME FOR LOWER BITS
035D  320230      J1        STA      C1ST; SAVE IT
0360  2F                    CMA      ;DAC HAS INVERTED INPUTS
0361  D302                  OUT      C1; SEND DATA TO LOWER BITS
0363  CD6D03      J12       CALL     WAIT; DELAY FOR 710 & DAC TO SETTLE
0366  DB0A                  IN       B2; GET 710 OUTPUT
0368  E601                  ANI      EQUAL
036A  FE00                  CPI      0; IS IT ZERO
036C  C9                    RET
036D  E5          WAIT      PUSH     H; THIS SUBROUTINE WAITS FOR THE DAC & 710 TO SETTLE OUT
036E  210700                LXI      H,7; PRESET COUNTER
0371  2B          WAITLP2   DCX      H; DECREMENT IT & IF NOT = 0 THEN LOOP AGAIN ELSE ALL DONE
0372  7C                    MOV      A,H
0373  FE00                  CPI      0
0375  C27103                JNZ      WAITLP2
0378  7D                    MOV      A,L
0379  FE00                  CPI      0
037B  C27103                JNZ      WAITLP2
037E  E1                    POP      H
037F  C9                    RET
0380              SAMPL     ENTRY    ; THIS OUTPUTS THE SAMPLE MUX CODE TO THE SAMPLE & HOLDS
0380                        ; FOR ABOUT 200 MICROSECONDS TO ENABLE THE SAMPLE & HOLDS
0380  3A0130                LDA      B1ST
0383  B1                    ORA      C
0384  D301                  OUT      B1; TURNS ON SAMPLE
```

```
0386  CD6D03                   CALL      WAIT
0389  3A0130                   LDA       B1ST
038C  D301                     OUT       B1; TURNS OFF SAMPLE
038E  C9                       RET
3000            RAM             EQU       03000H; STARTING RAM ADDRESS
30FF            STACK           EQU       RAM+255; STACK POINTER
3000            A1ST            EQU       RAM; A1 IMAGE STORE
3001            B1ST            EQU       RAM+1; B1 IMAGE STORE
3002            C1ST            EQU       RAM+2; C1 IMAGE STORE
3003            BINL            EQU       RAM+3; USED IN BINARY TO BCD(CVERT)
3004            BINH            EQU       RAM+4; USED IN BINARY TO BCD(CVERT)
3005            DATA3           EQU       RAM+5; NOT USED
3006            DATA2           EQU       RAM+6; NOT USED
3007            SIGN            EQU       RAM+7; 00="+",FFH="-"
3008            DPCOUNT         EQU       RAM+8;LOWER NIBBLE USED IN DISPLAY,MSB TO LSB=>EACH BIT FOR DECIMAL
3009            DACVL           EQU       RAM+9; USED IN A TO D CONVERSION
300A            DACVH           EQU       RAM+10; USED IN A TO D CONVERSION
300B            HUNS            EQU       RAM+11; USED IN DISPLAY ROUTINE FOR APROPRIATE DIGIT
300C            TENS            EQU       RAM+12; USED IN DISPLAY ROUTINE FOR APROPRIATE DIGIT
300D            UNITS           EQU       RAM+13; USED IN DISPLAY ROUTINE FOR APROPRIATE DIGIT
300E            A2ST            EQU       RAM+14; A2 IMAGE STORE
300F            THOUS           EQU       RAM+15; USED IN DISPLAY ROUTINE FOR APROPRIATE DIGIT
3010            B2ST            EQU       RAM+16; B2 IMAGE STORE
3011            SAMP1L          EQU       RAM+17; USED TO OUTPUT APROPRIATE SAMPLE BYTE
3012            SAMP1H          EQU       RAM+18; USED TO OUTPUT APROPRIATE SAMPLE BYTE
3013            SAMP2L          EQU       RAM+19; USED TO OUTPUT APROPRIATE SAMPLE BYTE
3014            SAMP2H          EQU       RAM+20; USED TO OUTPUT APROPRIATE SAMPLE BYTE
3015            VIN1L           EQU       RAM+21; LOCATION WHERE A TO D IS STORED
3016            VIN1H           EQU       RAM+22; LOCATION WHERE A TO D IS STORED
3017            VIN2L           EQU       RAM+23; LOCATION WHERE A TO D IS STORED
3018            VIN2H           EQU       RAM+24; LOCATION WHERE A TO D IS STORED
00DF            CH1ON           EQU       0DFH; CHANNEL 1 SELECT
0020            CH2ON           EQU       020H; CHANNEL 2 SELECT
0001            EQUAL           EQU       1 ;1=EQUAL,0=LESS THAN
MAKRO ASSEMBLER AMA.2
EA60            DELAY           EQU       60000
0030            PORT1SET        EQU       30H;A OUT,B OUT,C IN.
0000            PORT1           EQU       00H
0008            PORT2           EQU       8
0000            A1              EQU       PORT1
0001            B1              EQU       PORT1+1
0002            C1              EQU       PORT1+2
0003            X1              EQU       PORT1+3; CONTROL OF 8255
0008            X2              EQU       PORT2; CONTROL OF 8155
0009            A2              EQU       PORT2+1
000A            B2              EQU       PORT2+2
000B            C2              EQU       PORT2+3
000C            TIML            EQU       PORT2+4
000D            TIMH            EQU       PORT2+5
00EF            S1ON            EQU       0EFH; DIGIT CONTROL
0010            S1OFF           EQU       10H; DIGIT CONTROL
00DF            S2ON            EQU       0DFH; DIGIT CONTROL
0020            S2OFF           EQU       20H; DIGIT CONTROL
00BF            S3ON            EQU       0BFH; DIGIT CONTROL
0040            S3OFF           EQU       40H; DIGIT CONTROL
007F            S4ON            EQU       07FH; DIGIT CONTROL
0080            S4OFF           EQU       80H; DIGIT CONTROL
00FE            S5ON            EQU       0FEH; DIGIT CONTROL
0001            S5OFF           EQU       1 ; DIGIT CONTROL
0010            DP2ON           EQU       10H; DECIMAL CONTROL
00EF            DP2OFF          EQU       0EFH; DECIMAL CONTROL
0008            DP3ON           EQU       08H; DECIMAL CONTROL
00F7            DP3OFF          EQU       0F7H; DECIMAL CONTROL
0004            DP4ON           EQU       04H; DECIMAL CONTROL
00FB            DP4OFF          EQU       0FBH; DECIMAL CONTROL
0002            DP5ON           EQU       02H; DECIMAL CONTROL
00FD            DP5OFF          EQU       0FDH; DECIMAL CONTROL
0000            PLUS            EQU       0
0001            MINUS           EQU       1
```

What is claimed is:

1. A system for maintaining back-pressure in a low flow, low volume chemical testing apparatus, said apparatus including a chamber having input and output ends and in which pressure is to be maintained, means for applying at least one gas to the input end of said chamber, transducer means for measuring the pressure of said gas at the output end of said chamber and producing a first signal corresponding thereto, means downstream of said transducer for adjusting the back pressure of said chamber, means for producing a second signal corresponding to the magnitude of a desired back pressure within said chamber, a microprocessor-based control subassembly coupled to receive said second signal from said signal-producing means and to receive said first signal from said measuring means transducer, said subassembly producing a modified set-point signal in response to said two signals indicating the departure of the actual pressure as measured by said transducer from said desired back pressure, servo means for comparing said first signal and said modified set point signal for producing a difference error signal and supplying the latter to regulate said means for adjusting the back pressure thereby to cause the pressure within said chamber to approach closely the desired back pressure;

said means for applying said gas including a first automatically-operated flow valve in parallel with a second fast-acting prepressure flow valve, said second flow valve enabling said chamber to be quickly filled to approach the desired pressure at start up of said system; and said control subassembly including means for producing a third signal which is applied to said second valve for opening said second valve when the actual pressure in said chamber as measured by said transducer deviates by more than a predetermined amount from the desired set-point pressure.

2. A system according to claim 1 wherein said means downstream of said transducer for adjusting the back-pressure includes a third automatically-controlled valve.

3. A system according to claim 2 wherein said third valve is a modified flow-control valve.

4. A system according to claim 2 wherein said third valve is heated to a temperature sufficient to prevent condensation in the input to said valve of heavier molecular weight gases present at the output of said chamber.

5. The system according to claim 1 wherein said means for comparing said first signal and said modified set-point signal includes a servo amplifier coupled to said transducer means and to said subassembly for supplying said error signal to said back-pressure adjusting means.

6. The system according to claim 5 wherein said servo amplifier is of Type 2 construction.

7. The system according to claim 1 wherein said means for producing said second signal includes a computer which is coupled to said subassenbly and to said transducer means.

8. The system according to claim 1 wherein said chamber is a microreactor.

9. The system according to claim 1 wherein said chamber is a micropilot testing enclosure.

10. The system according to claim 1 wherein said control subassembly includes means for alternately processing said first and second signals.

11. The system according to claim 10 wherein said control subassembly includes a microprocessor and also has means for digitizing said first and second signals and placing them into simultaneous storage.

12. The system according to claim 11 wherein said subassembly includes means for comparing said digitized and stored first and second signals for ascertaining whether the difference in their values exceeds a predetermined magnitude in which case only said subassembly produces a third signals for opening said second valve.

13. The system according to claim 12 wherein said subassembly, after performing said comparison steps set forth therein includes means for determining whether differences in the values of said digitized and stored first and second signals exceeds a second predetermined magnitude which is smaller than said first magnitude, said second magnitude representing a much smaller deviation of the actual pressure from the desired set-point pressure than the deviation in said pressures represented by said first predetermined magnitude.

14. The system according to claim 13 wherein said subassembly, after making the determinations set forth therein, includes means for subsequently determining whether a predetermined delay has been introduced into all signal processing steps performed by it prior to said subsequent determining and, if not, operates so as to introduce said predetermined delay.

15. The system according to claim 14 wherein said subassembly, after the step of determining that said predetermined delay has been introduced, includes means for determining whether said first and second signals have represented the same pressure during a predetermined number of successive sampling time periods.

16. The system according to claim 15 wherein said subassembly, after the steps set forth therein of determining whether said first and second signals represent the same pressure, includes means for comparing said first and second signals and, to the extent that they are unequal, adds or subtracts predetermined amplitude increments or decrements to said second signal, said incremented or decremented second signal being said modified set-point signal which is then applied to said means for producing a difference error signal.

17. The system according to claim 16 wherein said subassembly, after performing the incrementing or decrementing steps set forth therein, includes means for again determining whether said first and second signals have been equal during a predetermined number of successive sampling periods.

18. The system according to claim 17 wherein said subassembly, after performing said steps set forth therein and determining that said first and second signals have been equal during said predetermined number of successive sampling periods, includes means for applying said modified set-point signal to said means for producing said difference error signal which thereupon applies the latter signal to said means for adjusting the back-pressure of said chamber.

* * * * *